United States Patent
Destain

(10) Patent No.: US 7,920,325 B2
(45) Date of Patent: Apr. 5, 2011

(54) SINGLE PRISM ABERRATION COMPENSATION

(75) Inventor: Patrick Rene Destain, Allen, TX (US)

(73) Assignee: Texas Intruments Incorporated, Dallas, TX (US)

( * ) Notice: Subject to any disclaimer, the term of this patent is extended or adjusted under 35 U.S.C. 154(b) by 0 days.

(21) Appl. No.: 12/794,910

(22) Filed: Jun. 7, 2010

(65) Prior Publication Data

US 2010/0238543 A1  Sep. 23, 2010

Related U.S. Application Data

(62) Division of application No. 11/948,827, filed on Nov. 30, 2007, now Pat. No. 7,742,229.

(51) Int. Cl.
  G02B 23/24 (2006.01)
  G02B 3/02 (2006.01)
  G02B 13/10 (2006.01)
(52) U.S. Cl. ........................ 359/434; 359/720
(58) Field of Classification Search .......... 359/423, 359/431, 433, 434, 720, 737
See application file for complete search history.

(56) References Cited

U.S. PATENT DOCUMENTS

| | | | |
|---|---|---|---|
| 6,666,557 B1 | 12/2003 | Choi | |
| 6,726,332 B2 | 4/2004 | Cannon et al. | |
| 6,760,168 B2 | 7/2004 | Lee | |
| 6,831,762 B2 | 12/2004 | Schuck et al. | |
| 6,908,197 B2 | 6/2005 | Penn | |
| 7,080,908 B2 | 7/2006 | Liao et al. | |
| 2006/0139730 A1* | 6/2006 | Oehler et al. | 359/291 |

OTHER PUBLICATIONS

Pan, J.-W., et al., "Portable digital micromirror device projector using a prism," Applied Optics, Aug. 1, 2007, vol. 46, No. 22, pp. 5097-5102, 2007 Optical Society of America.

* cited by examiner

*Primary Examiner* — David N Spector
(74) *Attorney, Agent, or Firm* — Charles A. Brill; Wade James Brady, III; Frederick J. Telecky, Jr.

(57) ABSTRACT

System and method for utilizing two prisms spatially separated is provided. The two prisms spatially separated allows the two prisms typically found in a TIR optical relay system to be spatially separated. In an embodiment, one or more optical relay lenses are interposed between the two prisms. The prism positioned on the object side may be integrated into one or more of the optical relay lenses, thereby further simplifying the optical relay design. In another embodiment, the one or more optical relay lenses may have an optical axis that is offset from the optical axis of incoming light to cause a pupil shift. An aspherical lens may be included to correct for the pupil shift and create a more uniform illumination image.

11 Claims, 3 Drawing Sheets

SINGLE PRISM ABERRATION COMPENSATION

This application is a Divisional of application Ser. No. 11/948,827 filed Nov. 30, 2007 (now U.S. Pat. No. 7,742,229).

TECHNICAL FIELD

Embodiments relate generally to the field of projection display systems and, more particularly, to an optical system utilizing a single refractive prism operating in total internal reflection mode.

BACKGROUND

Projection displays are used for a wide variety of applications, such as producing the pictures viewed on television screens. A typical projection display system includes a number of components, including a display screen, a light source, and an optical path between them. To create the pictures, one or more light sources are provided to emit light when it is needed. The light they produce is then manipulated by a series of optical devices in order to create the visual image. The visual image created along the optical path is then displayed on the display screen, the television screen for example, or another visual display. In most cases, the goal is to produce the best picture possible. The key to producing a desirable visual display, of course, is the configuration of the various optical devices along the optical path. The selection, operation, and configuration of these devices also contribute to unseen characteristics of the system, such as cost and efficient use of system resources.

Several types of projection displays have recently been developed. These new display systems are now becoming much more common, serving as a replacement for the widely-used CRT (cathode ray tube) display, which produces a visual image by producing and directing a stream of electrons at a treated display surface. The stream could only be directed to one point at any given time, but can be systematically swept across the display with such speed as to create the visual impression of a single image. This technology is fairly well-developed, but has reached the point where perceptible increases in quality are difficult to achieve. A CRT also takes up a relatively-large amount of space because the components used for generating the electron stream must be placed at a certain distance from the display screen. Many recently-developed projection display systems, in contrast, feature a much slimmer profile. In addition, projection display systems often produce much cleaner visual images. The combination of these advantages has made such systems immensely popular.

One such projection-display system is commercially available from Texas Instruments of Dallas, Tex. under the trademark DLP® (or Digital Light Processing®). DLP® projection-display systems utilize a digital micromirror device (DMD) in their optical path. The DMD typically includes an array of thousands of tiny mirrors that are used to manipulate light originating at an internal light source. Lenses and other components in the optical path adjust the light for use by the DMD, or convey the image it generates to a display plane.

Most such systems utilize a total internal reflection (TIR) prism arrangement or reverse TIR(RTIR) prism arrangement. With TIR prism arrangements wherein light is internally reflected on the image side, light modulated from the DMD intersects two complementary prisms equivalent to a parallel plate. With RTIR arrangements wherein the light is internally reflected on the projection side, the prisms must be such that lateral color and geometrical aberrations introduced by both prisms are partially compensating each other. In both of these types of systems, two prisms are used to compensate for aberrations, such as lateral color, anamorphic magnification, astigmatism, and the like, that using a single prism may cause.

The use of TIR or RTIR arrangements, however, requires extremely constraining manufacturing tolerances and is expensive to fabricate and to assemble. In particular, the prisms of TIR or RTIR arrangements are generally aligned such that the surfaces of the prisms are parallel and extremely close. Furthermore, the TIR or RTIR arrangements may exhibit contrast problems due to the high angle of incidence on both surfaces creating the gap between the two prisms inducing multiple parasitic reflections close to the focal plane and therefore degrading the contrast.

SUMMARY OF THE INVENTION

These and other problems are generally solved or circumvented, and technical advantages are generally achieved, by embodiments of the present invention which provide a system and a method for utilizing a single TIR prism to compensate for aberrations.

In accordance with an embodiment, an optical system is provided. The optical system includes a light source, a receiving plane, and a first lens system interposed between the light source and the receiving plane for directing light from the light source to the receiving plane. The first lens system includes a first optical element, a first prism, and one or more relay lenses interposed between the first optical element and the first prism. The first optical element causes a prismatic effect and may comprise a prism concatenated to a lens. The first optical element may have a spherical surface, an aspherical surface, or a flat surface. The first optical element may also comprise a Fresnel lens or a lens having an optical power. The optical axes of the one or more relay lenses may be offset from the optical axis of incoming light. Furthermore, one or more of the optical relay lenses may have a spherical surface, an aspherical surface, or a flat surface.

In accordance with another embodiment, a method of providing light to a receiving plane is provided. Light is provided along a first axis to a first optical element, which is tilted relative to the first axis. Light leaving the first optical element is provided to one or more relay lenses, which provides the light to a first prism. Light leaving the first prism is directed to the receiving plane, such as a spatial light modulator. The first optical element causes a prismatic effect and may be a concatenation of a prism and a lens, such as a lens having a spherical surface or an aspherical surface. The first optical element may also comprise a Fresnel or powered lens. The optical axes of the one or more relay lenses may be offset from the optical axis of incoming light. Furthermore, one or more of the optical relay lenses may have an aspherical surface.

In accordance with yet another embodiment, an optical arrangement is provided. The optical arrangement includes a TIR assembly, which includes a first prism and a second prism. The first prism and the second prism of the TIR assembly are spatially separated and one or more intermediate lenses are interposed between the first prism and the second prism along an optical path. The one or more intermediate lenses preferably have an optical axis that is parallel to the optical axis of the incoming light. The optical axis of the one or more intermediate lenses, however, may be offset from the optical axis of the incoming light or tilted or both. The first prism of the TIR assembly may comprise a first prism combined with another lens, such as a spherical lens, aspherical lens, a Fresnel lens, a lens having an optical power, or the like, combined into a single lens. One or more of the intermediate lenses may also include an aspherical lens to correct for spherical aberration when the lens is shifted, for example, to introduce a pupil shift and for pupil aberration as well or distortion correction.

The foregoing has outlined rather broadly the features and technical advantages of some of the embodiments of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a DMD-based projection display system. Embodiments may also be applied, however, to projection display systems in general. Furthermore, while embodiments will be described with reference to DMDs, other spatial light modulators (SLMs) may be used.

Additionally, embodiments of the present invention may be utilized in other types of systems besides projection display systems. In particular, other embodiments may be utilized in other types of systems wherein using a prism may be desirable to obtain wavelength dispersion and deviation without the associated aberrations, such as lateral color aberrations, anamorphic magnification aberrations, astigmatism, or the like. For example, systems in which embodiments may be utilized in spectrometers, imaging applications, or the like. In the example of a spectrometer, light is intentionally dispersed through a prismatic element and optical quality is required with a source with low extension in one direction (slit) but with high angular dispersion to provide optimum spectral resolution. In other imaging applications, such as HyperSpectral applications, the source can be extended in both directions. Projection display systems are used herein simply to illustrate an embodiment as an example.

Figure 1:
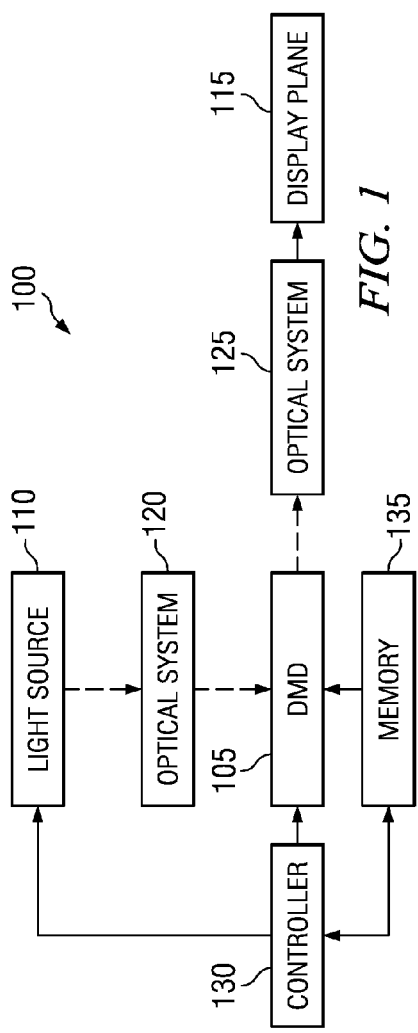
FIG. 1 is a diagram of different views of an exemplary DMD-based projection display system.

With reference now to FIG. 1 is a diagram illustrating views of an exemplary DMD-based projection display system. The diagram shown in FIG. 1 illustrates a high-level view of a DMD-based projection display system 100, which includes a DMD 105 that modulates light produced by a light source 110. The DMD 105 is an example of a microdisplay. In a microdisplay, an array of light modulators may be arranged in a rectangular, square, diamond shaped, and so forth, array. Each light modulator in the microdisplay may operate in conjunction with the other light modulators to modulate the light produced by the light source 110. The light, modulated by the DMD 105, may be used to create images on a display plane 115. The DMD-based projection display system 100 also includes a first optical system 120, which may be used to collimate the light produced by the light source 110 as well as collect stray light, and a second optical system 125, which may be used to manipulate (for example, focus and magnify) the light reflecting off the DMD 105.

The DMD 105 may be coupled to a controller 130, which may be responsible for loading image data into the DMD 105, controlling the operation of the DMD 105, controlling the light produced by the light source 110, and so forth. A memory 135, which may be coupled to the DMD 105 and the controller 130, may be used to store the image data, as well as configuration data, color correction data, and so forth.

Figure 2:
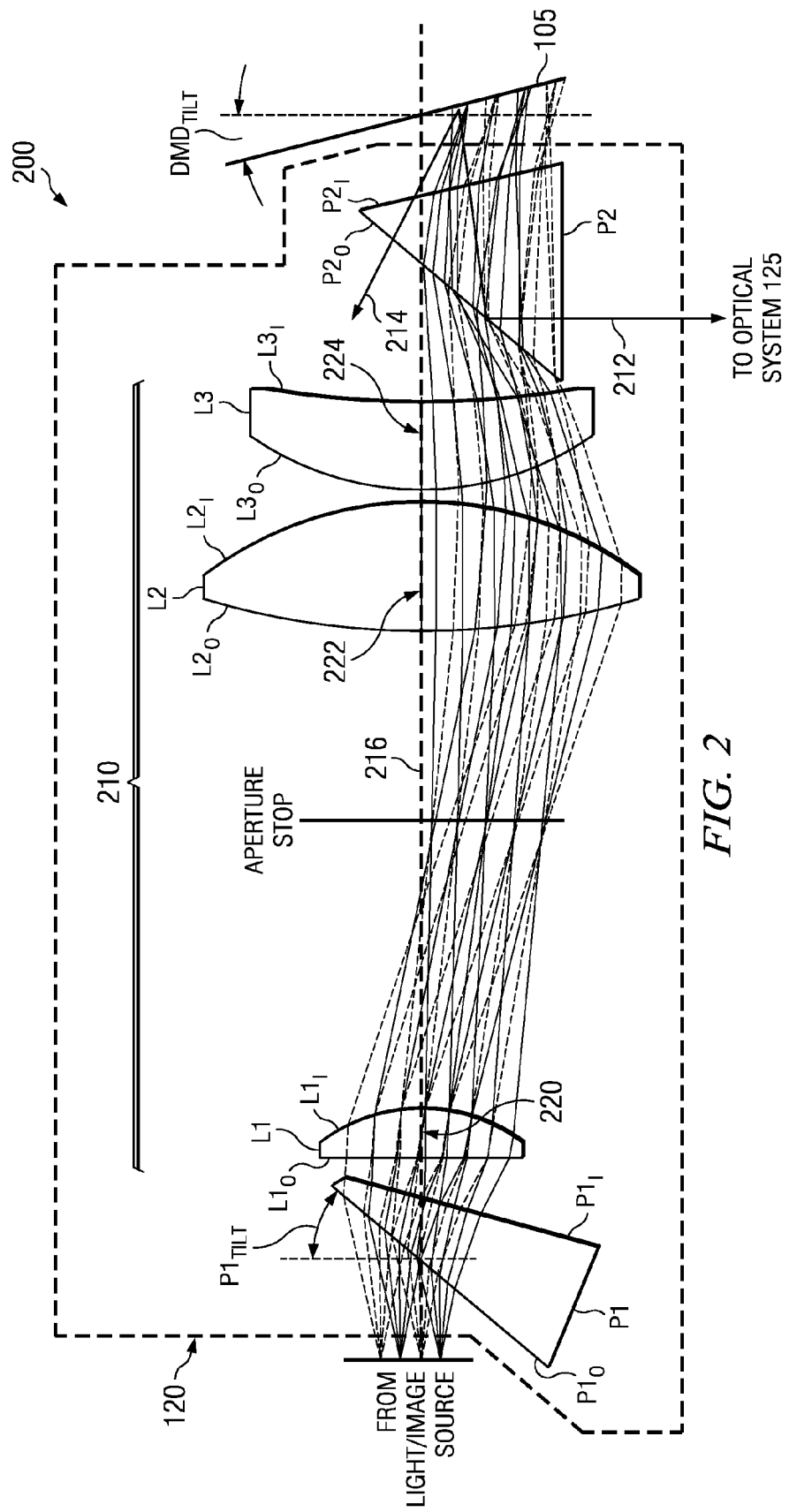
FIG. 2 illustrates an optical system that may be used in accordance with an embodiment.

FIG. 2 illustrates an optical path 200 that may be used in the first optical system 120 in accordance with an embodiment. In this embodiment, the first optical system 120 includes a first prism P1, a set of relay lenses, denoted generally as reference numeral 210, and a second prism P2. In operation, the optical path 200 includes light deviated through a first prism P1 from a light/image source (not shown), such as the light source 110 illustrated in FIG. 1. The light passing through the first prism P1 is reimaged through the set of relay lenses 210. In the embodiment illustrated in FIG. 2, the set of relay lenses 210 includes a first relay lens L1, a second relay lens L2, and a third relay lens L3, which together shape the polychromatic light beam for the second prism P2.

Light deviated through the second prism P2 is directed to a receiving plane, such as the DMD 105, which modulates the light in accordance with a desired image as described above. The DMD 105 reflects light from pixels in the "on" state back to the second prism P2 such that the light rays strike the exiting surface $P2_I$ of the second prism P2 at an angle greater than the critical angle. In this manner, the light from pixels in the "on" state is reflected toward the second optical system 125 and the display plane 115 (see FIG. 1), as indicated by line 212 in FIG. 2. Light from pixels in the "off" state, on the other hand, is reflected back to the second prism P2 such that the light rays strike the exiting surface $P2_O$ of the second prism P2 at an angle less than the critical angle, thereby allowing the light rays to pass through the second prism P2 toward a light sink (not shown), as illustrated by line 214 in FIG. 2.

One of ordinary skill in the art will appreciate that the first optical system 120 utilizes a single prism on the image side, e.g., the second prism P2 in this embodiment, as opposed to two prisms utilized in other types of systems utilizing a TIR or RTIR arrangement as discussed above. Embodiments such as that illustrated in FIG. 2 replace a second prism that is typically placed in close proximity to the second prism P2 with the first prism P1 on the object side of the relay lenses 210. The first prism P1 is rotated, flipped, and placed on the object side of the first set of relay lenses 210 from a position typically used in other systems. In this manner, the placement and alignment of the first prism P1, the first set of relay lenses 210, and the second prism P2 relative to each other is not as critical or as expensive to manufacture as other prior art systems, including the critical alignment of the two prisms relative to each other. Furthermore, because the first prism P1 is further apart from the second prism P2, multiple bounces between both surfaces defining the gap does not reduce the contrast in the image plane (DMD or other).

It should be noted that, in embodiments such as that illustrated in FIG. 2 in which the DMD 105 is used as the SLM, an optical axis 216 of the incoming light is aligned such that the optical axis 216 is not orthogonal to the surface of the DMD 105, as illustrated in FIG. 2 by the angle $DMD_{Tilt}$. For example, in an embodiment in which the mirrors rotate +/−12° between the on and off states, the plane orthogonal to the optical axis 216 is preferably offset about 12° from the surface of the DMD 105. This alignment of the optical axis 216 helps ensure a higher angle of incidence of about 24° on the DMD 105. It should be noted that this angle vary depending on the pupil offset (lateral shift of the first group and second group of lenses) and the angular deviation power in the second prism P2.

As illustrated in FIG. 2, the optical axes of the first relay lens L1, the second relay lens L2, and the third relay lens L3, indicated by reference numerals 220, 222, and 224, respectively, may be coincident with the optical axis 216 of the first lens system 120. The first prism P1, however, is preferably tilted relative to the optical axis 216 of the light/image source such that the surface on the object side of the first prism P1, indicated as $P1_O$ in FIG. 2, is not orthogonal to the optical axis 216, as indicated in as $P1_{Tilt}$. In an embodiment, $P1_{Tilt}$ is about 33°. Other embodiments, however, may utilize different tilt angles.

Solely for purposes of illustration, an embodiment may be implemented such that the first relay lens L1, the second relay lens L2, and the third relay lens L3 exhibit the properties as specified in Table I, wherein the subscript "O" refers to the object side and the subscript "I" refers to the image side of each respective optical element.

Figure 3:
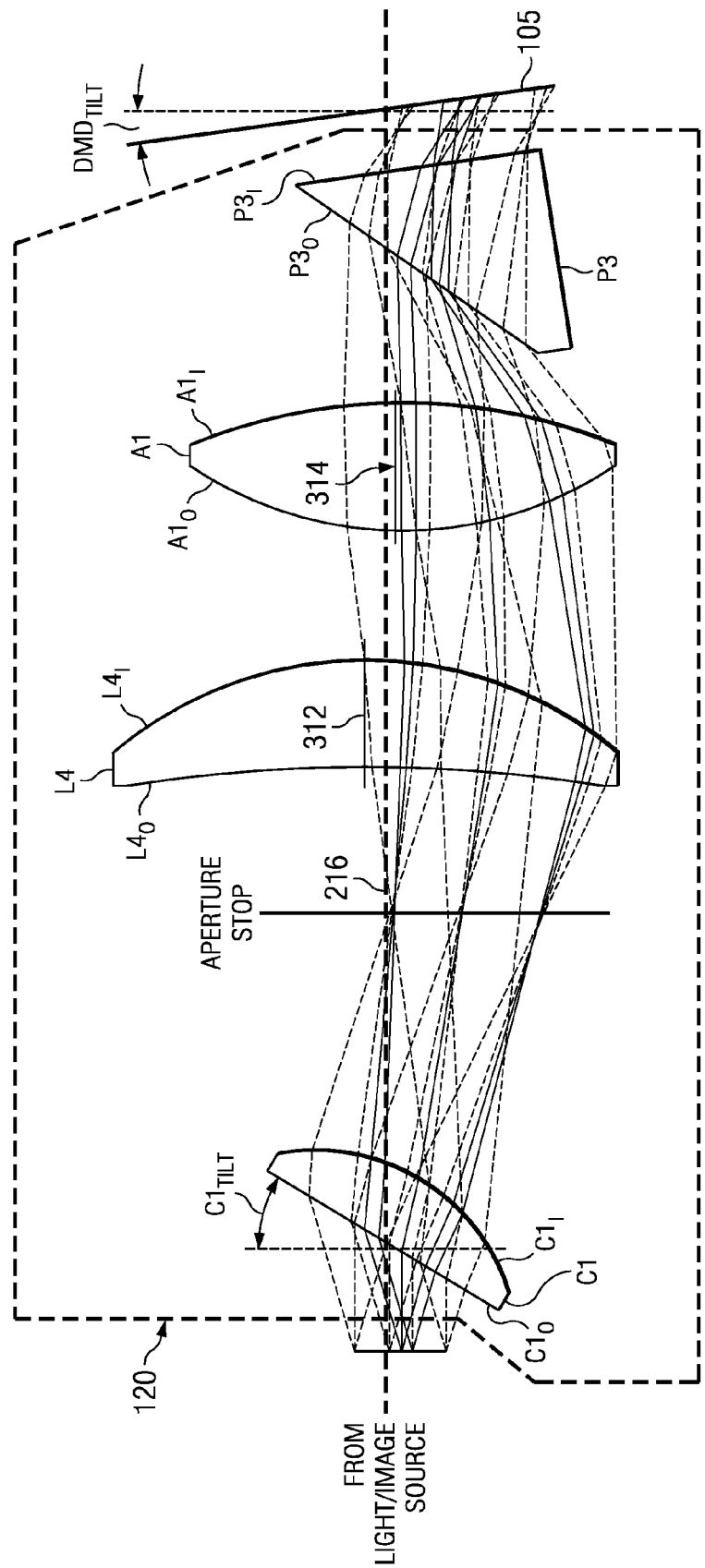
FIG. 3 illustrates an optical system that may be used in accordance with another embodiment.

FIG. 3 illustrates another embodiment of the first lens system 120. In this embodiment, the first lens system 120 includes an optical element C1, a fourth relay lens L4, an aspherized lens A1, and a third prism P3. The optical element C1 is substantially equivalent to the concatenation of the first prism P1 and the first relay lens L1 as illustrated in FIG. 2. The concatenation of the first prism P1 and the first relay lens L1 simplifies the fabrication process, thereby further lowering costs. Furthermore, in some embodiments the optical element C1 may be fabricated as a wedge lens, which is a portion of a spherical lens. Spherical lenses, and wedge lenses, may be fabricated relatively easily and inexpensively, thereby further allowing costs to be reduced.

The fourth relay lens L4 is preferably has an object surface $L4_O$ having a convex surface and an image surface $L4_I$ having a concave surface. The aspherized lens A1 has a spherical surface $A1_O$ on the object side and an aspherized surface $A1_I$ on the image side. The aspherized surface $A1_I$ of the aspherized lens A1 helps correct for pupil non-uniformity. It has been found that the tilting and decentering of the optical element C1 and/or the use of the aspherized lens A1 helps optimize the DMD illumination uniformity (near field and far field).

In a preferred embodiment, optical axes of the fourth relay lens L4 and the aspherized lens A1 are not coincident with the optical axis 216 of the incoming light. Rather, in a preferred embodiment, the fourth relay lens L4 preferably has an optical axis 312 and the aspherical lens A1 has an optical axis 314 that is parallel to the optical axis 216 of the incoming light, but is not coincident with the optical axis 216 as illustrated in FIG. 3. The optical axis 312 of the fourth relay lens L4 and the optical axis 314 of the aspherical lens A1 are parallel to, but offset from, the optical axis 216. In this manner, the fourth relay lens L4 causes an optical pupil shift while the aspherized lens A1 with the aspherized surface $A1_I$ corrects for the pupil illumination uniformity.

In a preferred embodiment, the optical element C1 has a surface on the object side, indicated by reference numeral $C1_O$, is tilted from a plane orthogonal to the optical axis 216.

TABLE I

| Surface | Radius (mm) | Thickness (mm) | CAO (mm) | Index | Tilt (degrees) | Decenter (mm) | Remarks |
|---|---|---|---|---|---|---|---|
| Object | Infinity | 6 | 4.5 × 6.0 | Air | 0 | 0 | Light pipe output |
| $P1_O$ | Infinity | 6 | 12 | 788475 | 33 | 0 | |
| $P1_I$ | Infinity | 4 | 13 | air | −12 | 6 | |
| $L1_O$ | 801.257 | 4 | 9.7 | 2022291 | | | Lens 1 |
| $L1_I$ | −24.628 | 21 | 10.2 | air | 0 | 6 | |
| Aperture Stop | Infinity | 16.257 | 13 | air | 0 | 6 | Aperture Stop |
| $L2_O$ | 100.712 | 10 | 20.7 | 846238 | 0 | 6 | |
| $L2_I$ | −39.894 | 1 | 20.9 | air | 0 | 6 | |
| $L3_O$ | 35.232 | 7 | 16.6 | 805254 | 0 | 6 | |
| $L3_I$ | 201.13 | 11 | 15 | air | | 6 | |
| $P2_O$ | Infinity | 5 | 17.46 | 607566 | 33.64 | 6 | Right Angle prism |
| $P2_I$ | Infinity | 6 | 17.46 | air | −11.358 | 6 | |
| Image Plane | Infinity | | 17.46 | mirror | −11.358 | 6 | DMD |

In this embodiment, the second prism P2 is a right-angle prism and is positioned such that one leg of the right-angle prism is parallel to the DMD 105 and the incoming light from the light source enters the second prism P2 along the hypotenuse. Preferably, the second prism P2 is positioned such that the light modulated from the DMD 105 is folded at about 90 degrees towards projection lens. For that purpose, the angle should be higher than the critical angle on the hypotenuse of the second prism P2.

This tilt is indicated in FIG. 2 as $C1_{Tilt}$. Similarly, the surface of the receiving plane, the DMD 105 in the embodiment illustrated in FIG. 3, is non-orthogonal to optical axis 216, as indicated by $DMD_{Tilt}$ in FIG. 3.

Solely for purposes of illustration, an embodiment such as that illustrated in FIG. 3 may be implemented such that the optical element C1, the fourth relay lens L4, and the aspherized lens A1 exhibit the properties as specified in Table II.

TABLE II

| Surface | Radius (mm) | Thickness (mm) | CAO (mm) | Index | Tilt (degrees) | Decenter (mm) | Remarks |
|---|---|---|---|---|---|---|---|
| Object | Infinity | 8.39 | 4.5 × 6.0 | Air | 0 | 0 | Light pipe output |
| $C1_O$ | Infinity | 6.533 | 11 | 620381 | 32.61 | −1.22 | On axis tilted lens |
| $C1_I$ | 8.3917 | 24 | 12 | air | | | |
| Aperture Stop | Infinity | 16 | 10.2 | air | 0 | | Aperture Stop |
| $L4_O$ | −120.29 | 10 | 21 | 651585 | 0 | 6.64 | |
| $L4_I$ | −31.764 | 12 | 22 | air | | | |
| $A1_O$ | 30.357 | 12 | 18.5 | 492574 | 0 | 3.52 | PMMA |
| $A1_I$ | −32.75 (cc = −5.11) | 13.44 | 15 | air | | | |
| $P2_O$ | Infinity | 8 | 18 | 607566 | 36.6 | | Right Angle prism |
| $P2_I$ | Infinity | 6 | 10.4 | air | −8.4 | | |
| Image Plane | Infinity | | 13.34 | mirror | −8.4 | −5 | DMD |

(cc represents the Conic Constant)

It should be noted that the optical element C1 is illustrated having a spherical surface for illustrative purposes only and that other embodiments may utilize other types of lenses that induces a prismatic effect. For example, in other embodiments the optical element C1 may have a spherical surface, an aspherical surface, a flat surface, or the like as required by a particular application. As further examples, the optical element C1 may comprise a wedge, a prism, a spherical lens, an aspherical lens, a Fresnel lens, a lens having an optical power, or the like in other embodiments.

Figure 4:
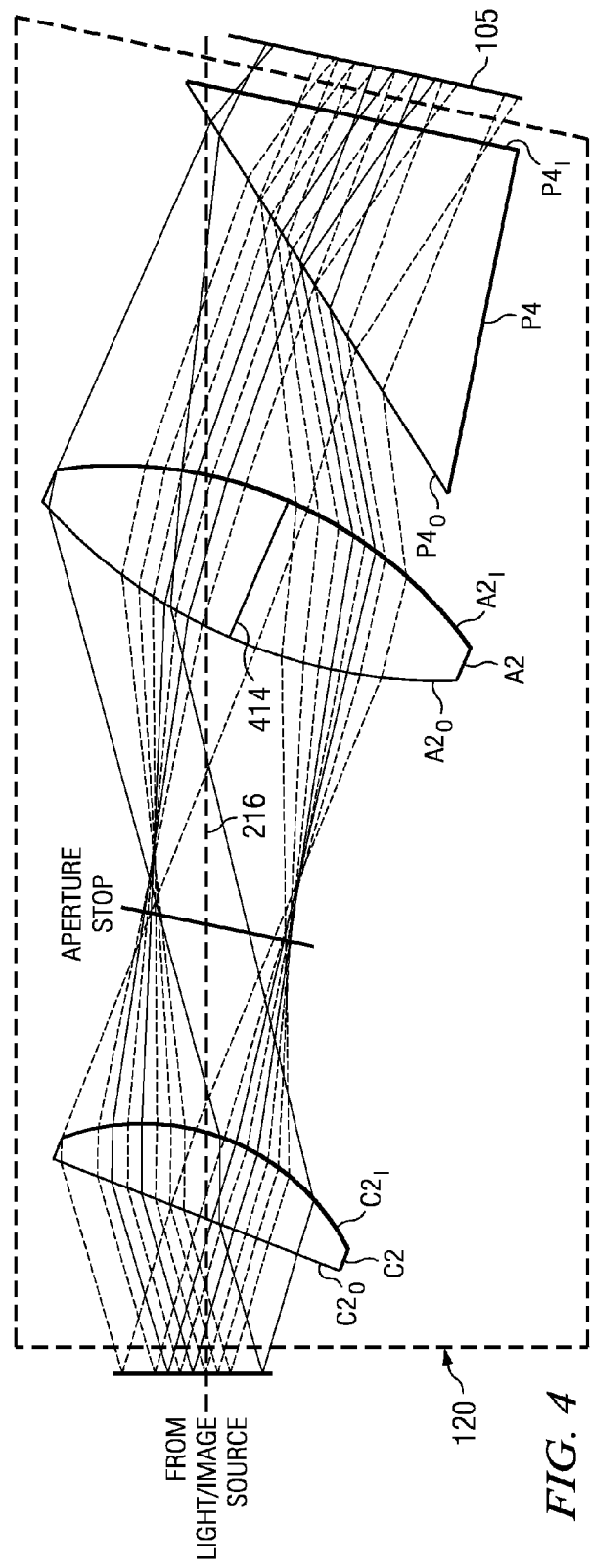
FIG. 4 illustrates another optical system that may be used in accordance with yet another embodiment.

FIG. 4 illustrates another embodiment of the first lens system 120 having two lenses with a tilt and an offset. In this embodiment, the first lens system 120 includes an optical element C2, an aspherized lens A2, and a fourth prism P4. Similar to the embodiment discussed above with reference to FIGS. 2 and 3, the first prism has been concatenated with a lens to form the optical element C2, which simplifies the fabrication process and lowers costs. The optical element C2 may comprise a lens having a prismatic effect, and may include, for example, a spherical surface, an aspherical surface, or a flat surface. The optical element may exhibit properties of a lens, such as a wedge, a prism, a spherical lens, an aspherical lens, a Fresnel lens, a lens with optical power, or the like in other embodiments.

In an embodiment, the aspherized lens A2 may be substantially similar to the aspherized lens A1 utilized in the embodiment discussed above with reference to FIG. 3, except that the aspherized lens A1 in this embodiment is tilted relative to the optical axis 216. Accordingly, in an embodiment, the aspherized lens A2 has a spherical first surface $A2_O$ on the object side and an aspherized second surface $A2_I$ on the image side. The aspherized second surface $A2_O$ of the aspherized lens A2 on the object side helps correct for pupil non-uniformity.

The optical element C2 and the aspherized lens A2 may be tilted relative to the optical axis 410. In a preferred embodiment, the optical element C2 is tilted as described above with reference to FIG. 3, and the aspherized lens A2 has an optical axis 414 that is both tilted offset relative to the optical axis 216. The positioning of the aspherized lens A2 is further discussed below.

Solely for purposes of illustration, an embodiment such as that illustrated in FIG. 4 may be implemented such that the optical element C2, the aspherized lens A2, and the fourth prism P4 exhibit the properties as specified in Table III.

TABLE III

| Surface | Radius (mm) | Thickness (mm) | CAO (mm) | Index | Tilt (degrees) | Decenter (mm) | Remarks |
|---|---|---|---|---|---|---|---|
| Object | Infinity | 11.4 | 4.5 × 6.0 | Air | 0 | 0 | Light pipe output |
| $C2_O$ | Infinity | 6 | 11.3 | 822374 | 20.06 | −0.409 | |
| $C2_I$ | Infinity | 18.75 | 11.82 | air | | | |
| Aperture Stop | 801.257 | 17 | 6 | air | 10.5 | 0 | Aperture Stop |
| $A2_O$ | 35.232 (cc = −3.74) | 12 | 15.8 | 585299 | 23.064 | 0 | Polycarbonate |
| $A2_I$ | 201.13 (cc = −2.42) | 13.885 | 16.4 | air | | | |
| $P4_O$ | Infinity | 5 | 11.9 | 607566 | 55.57 | 0 | Right Angle prism |
| $P4_I$ | Infinity | 14 | 10.9 | air | −10.57 | 0 | |
| Image Plane | Infinity | 2.404 | 12 | mirror | −10.57 | 6 | DMD |

(cc represents the Conic Constant)

One of ordinary skill in the art will appreciate that the configuration of the embodiments discussed above utilizes a single prism (or other lens causing a prismatic effect) on the object side (e.g., the light source side) and a single prism on the object side (e.g., the receiving plane or DMD side). The configurations discussed above use a magnification of about −1. Other magnifications, however, may be utilized such as magnifications ranging from about −0.8 to about −1.5. Other embodiments may use a smaller or larger magnification, either negative or positive sign of magnification.

It should also be understood that other elements may be between the prism on the object side and the light or image source. For example, it may be desirable to place a lens between the light source and the prism on the object side to magnify the light.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An optical system comprising:
    a light source to produce a light beam, the light source having a first optical axis;
    a receiving plane; and
    a first lens system interposed between the light source and the receiving plane, the first lens system directing the light beam from the light source to the receiving plane and including a first optical element, one or more relay lenses, and a first prism, the one or more relay lenses being interposed between the first optical element and the first prism, the first optical element having a prismatic effect.

2. The optical system of claim 1, wherein the optical element comprises a prism concatenated with a first lens.

3. The optical system of claim 1, wherein the optical element has a spherical surface.

4. The optical system of claim 1, wherein the optical element has an object-side surface that is substantially planar, the object-side surface being tilted with respect to normal to the first optical axis.

5. The optical system of claim 1, wherein the one or more relay lenses have optical axes parallel to and offset from the first optical axis.

6. The optical system of claim 1, wherein the one or more relay lenses include a first lens tilted relative to the first optical axis.

7. The optical system of claim 1, wherein the first prism induces an aberration and the optical element causes a prismatic effect to substantially correct the aberration.

8. A method of manufacturing an optical system, the method comprising:
    providing a light source to provide light along a first axis;
    providing a first optical element such that the first optical element intercepts light on the first axis, the first optical element causing a prismatic effect on the light and having a substantially planar surface facing the light source, the planar surface being non-orthogonal to the first axis;
    providing one or more relay lenses to receive light from the first optical element;
    providing a first prism to receive light from the one or more relay lenses; and
    providing a receiving plane to receive light from the first prism.

9. The method of claim 8, wherein the first optical element comprises a prism concatenated with a first lens.

10. The method of claim 8, wherein the one or more relay lenses have optical axes parallel to and offset from the first axis.

11. The method of claim 8, wherein the one or more relay lenses include a first lens having an aspherical surface.

* * * * *